Jan. 13, 1942.            J. J. RATH                2,270,009
                       LATHE ATTACHMENT
                      Filed May 20, 1940
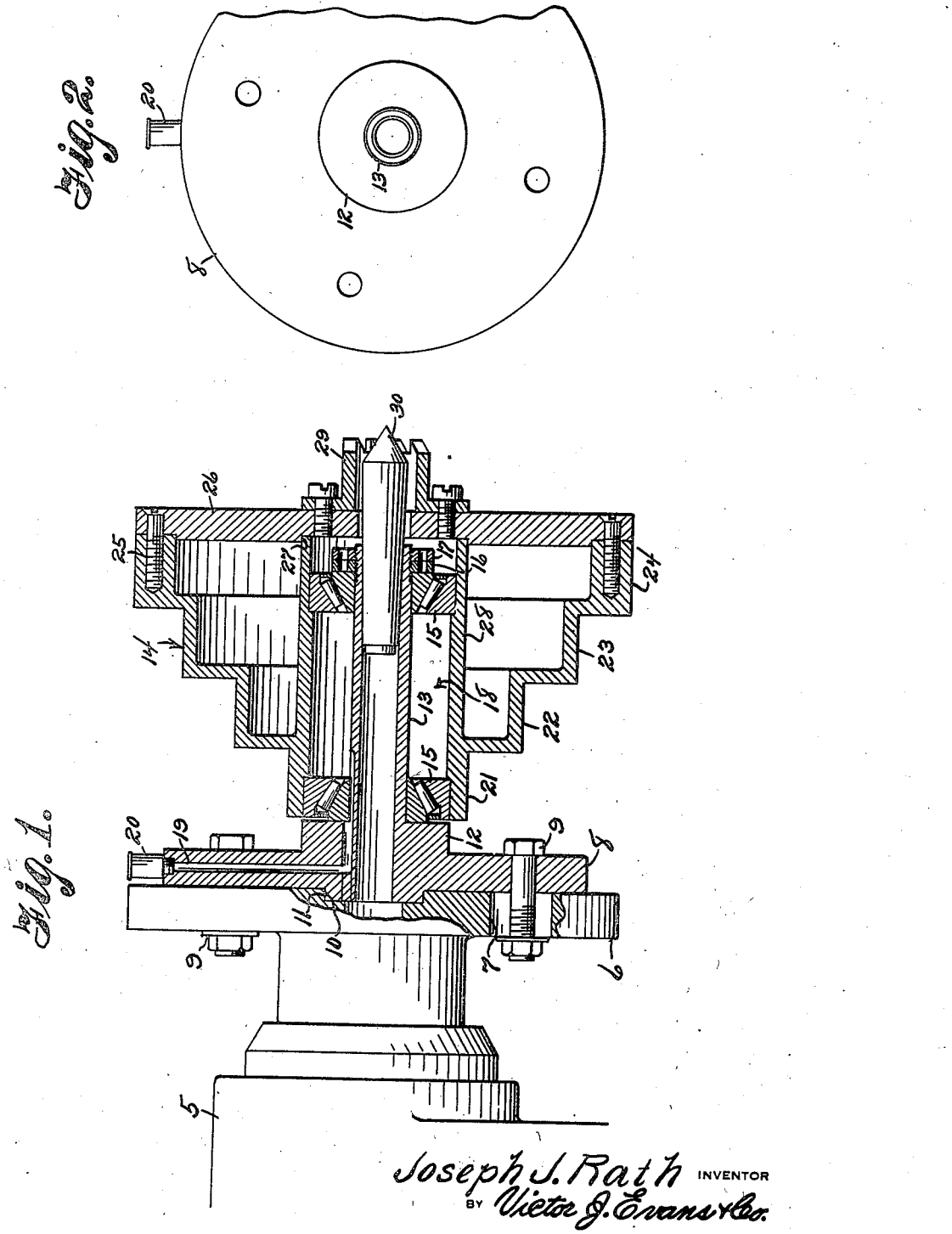
Joseph J. Rath INVENTOR
BY Victor J. Evans & Co.
ATTORNEYS Patented Jan. 13, 1942

2,270,009

UNITED STATES PATENT OFFICE 2,270,009

LATHE ATTACHMENT

Joseph J. Rath, Chicago, Ill.

Application May 20, 1940, Serial No. 336,243

6 Claims. (Cl. 82—7)

The present invention relates to improvements in lathe attachments.

The primary object of the invention resides in the provision of an attachment for a metal working lathe that will convert the same into a wood turning speed lathe requiring variable speeds of high velocity.

Another object of the invention resides in the provision of a lathe attachment having the above characteristics, including a disc adapted to be attached to the face plate of a metal lathe and a hollow tubular spindle or shaft projecting therefrom carrying bearings on which is mounted a step cone pulley with a work supporting spur secured to the face of the pulley whereby a conventional metal lathe will be converted into a speed lathe for wood turning, the step cone pulley providing a means for rotating the work carried thereby at variable speeds.

The invention will be fully and comprehensively understood from a consideration of the following detailed description when read in connection with the accompanying drawing which forms a part of the application.

In the drawing:

Figure 1 is a side elevational view partly in section illustrating the attachment applied to a metal lathe, a portion only of the metal lathe being shown.

Figure 2 is a fragmentary front elevational view of the metal disc removed from the lathe.

Referring to the drawing for a more detailed description thereof, the forward bearing of a head stock of a metal lathe is generally designated by the reference numeral 5, said head stock having conventionally attached thereto a face plate 6 which normally rotates with the head stock. The face plate 6 is usually formed with a plurality of slots 7 for attaching or centering work thereon, which slots are to be utilized when securing the attachment thereto.

The attachment includes a metal disc 8 which lies flush against the face plate 6 and is bolted or otherwise secured thereto as indicated at 9, said bolts extending through the slots 7 as is readily apparent from an inspection of Figure 1 of the drawing. The central portion of the plate 6 is counterbored as indicated at 10 for receiving the pilot 11 projecting from the central portion of the disc 8. Thus the disc 8 will be centered on the plate 6 and will be fixedly secured thereto by means of the bolts 9.

A hub 12 is formed centrally of the disc 8 on the opposite side of the pilot 11 and projecting from and integral therewith is a hollow tubular shaft 13. The hub 12 spaces the pulley, generally designated by the reference numeral 14, from the disc 8 which pulley is rotatably mounted on the tubular shaft 13. Roller bearings 15 are mounted on the shaft 13 to which the pulley 14 is fixedly attached, said bearings being held thereon by means of the adjusting and lock nuts 16 and 17, respectively. The space 18 between the roller bearings 15 forms an oil reservoir for retaining an ample supply of lubricant fed through the channel 19 from an oil cup 20, said oil cup being mounted in the periphery of the disc 8 and communicating with the channel 19 extending radially of the disc.

The step cone may be made of wood or aluminum and is of hollow formation and provides stepped surfaces 21, 22, 23 and 24 adapted to receive a belt for driving the same from a source of power, not shown. It is readily understood that the belt receiving surfaces of the pulley being of different diameters will provide for a different speed of rotation of the pulley and the work being carried thereby. The surfaces can be modified to accommodate the use of a flat or V-type belt within the meaning of the invention. The outer end of the pulley has bolted or otherwise secured thereto, as indicated at 25, a plate 26, said plate being recessed as indicated at 27 for receiving the inner tubular portion 28 of said pulley.

A spur center 29 is attached centrally of the plate 26 and may be formed for receiving a drill chuck, lathe chuck, or the like used in wood turning. A tapered centering pin 30 is held within the tubular shaft 13 and projects beyond the spur center 29 for centering any work being turned by the pulley 26.

It is believed that the operation and advantages of the attachment are readily apparent. The centering of the disc 8, when applying the attachment, is accomplished by means of the pilot 11 fitting within the counterbore 10 after which the bolts 9 are secured within the slots 7. For driving the pulley, a belt will be applied to one of the stepped surfaces, depending upon the speed desired, and the work centered on the means 29 and 30. A metal lathe has thus been converted into a speed lathe for wood turning and since the spindle or shaft 13 is hollow, it permits the use of the lathe for rod work. The attachment can be applied and removed with a minimum amount of time and effort.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. An attachment for metal lathes comprising, a disc adapted to be attached to the face plate of said lathe, means for centering said disc on said face plate, a hollow tubular spindle projecting centrally from said disc, a step cone pulley mounted on said spindle, and work supporting means adapted to be attached to one face of said pulley to be rotated at variable speeds thereby.

2. An attachment for metal lathes comprising, a disc adapted to be attached to the face plate of said lathe, a hollow tubular spindle projecting centrally of said disc, roller bearings supported on said spindle, a step cone pulley attached to said bearings, and work supporting means adapted to be attached to one face of said pulley to be rotated at variable speeds thereby.

3. An attachment for metal lathes comprising, a disc adapted to be attached to the face plate of said lathe, means carried by said disc for centering the same on said face plate, a hollow tubular spindle projecting centrally from said disc, a step cone pulley mounted on said spindle, and work supporting means adapted to be attached to one face of said pulley to be rotated at variable speeds thereby.

4. An attachment for metal lathes comprising, a disc adapted to be attached to the face plate of said lathe, a pilot projecting centrally of one face of said disc for centering the same on said face plate, a tubular spindle projecting centrally from the other face of said disc, a step cone pulley mounted on said spindle, and a plate attached to the outer face of said pulley for supporting work thereon to be rotated at variable speeds by said pulley.

5. An attachment for metal lathes comprising, a disc adapted to be attached to the face plate of said lathe, a pilot projecting centrally of one face of said disc for centering the same on said face plate, a tubular spindle projecting centrally from the other face of said disc, roller bearings supported on said spindle, a step cone pulley mounted on said bearings, a plate attached to the outer face of said pulley, and work supporting means adapted to be attached to said plate to be rotated at variable speeds thereby.

6. In an attachment for lathes, a support plate adapted to be secured in face to face relation with the face plate of the lathe, a spindle projecting from the center of the support plate and axially with relation to the face plate, a pulley rotatably mounted on the said spindle, and a work holding plate secured to the outer end of the pulley.

JOSEPH J. RATH.